C. H. COX.
PNEUMATIC VIBRATION DIFFUSER.
APPLICATION FILED JAN. 26, 1909.
992,483.
Patented May 16, 1911.
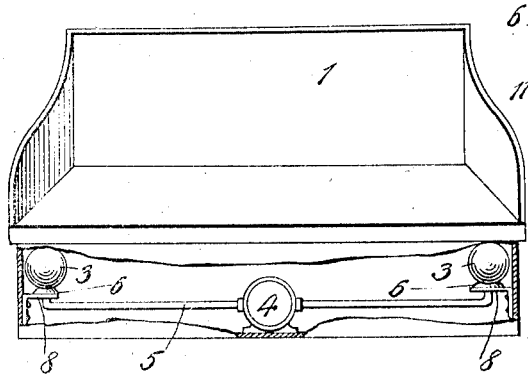
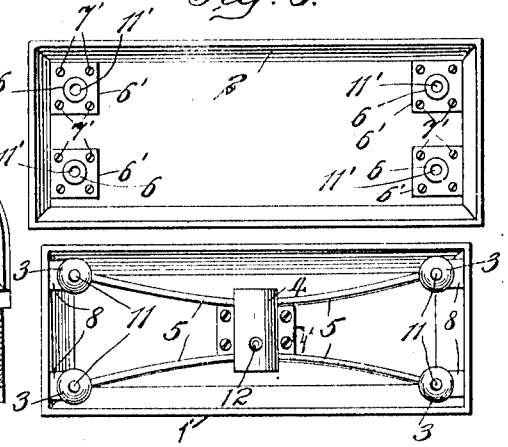
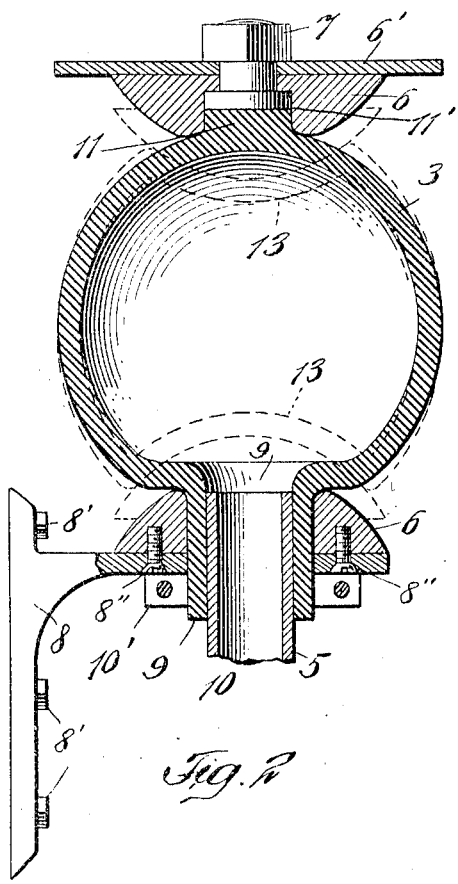
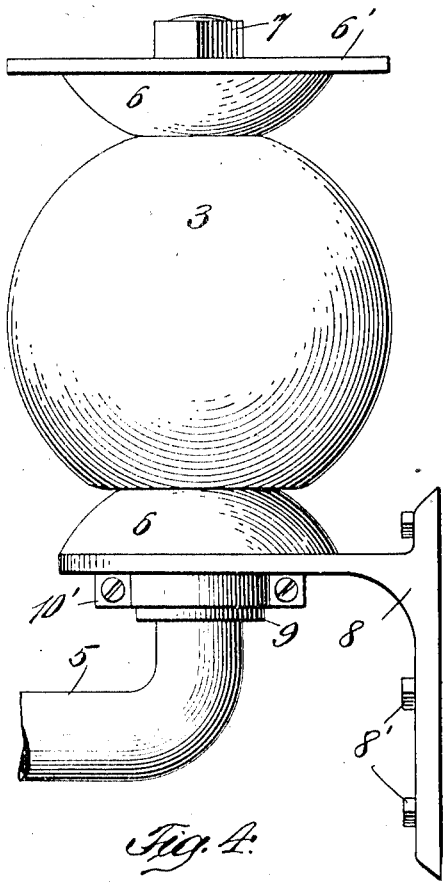

UNITED STATES PATENT OFFICE.

CHARLES H. COX, OF LOS ANGELES, CALIFORNIA.

PNEUMATIC VIBRATION-DIFFUSER.

992,483. Specification of Letters Patent. Patented May 16, 1911.

Application filed January 26, 1909. Serial No. 474,337.

*To all whom it may concern:*

Be it known that I, CHARLES H. COX, a citizen of the United States, residing at Los Angeles, in the county of Los Angeles and State of California, have invented a new and useful Pneumatic Vibration-Diffuser for Vehicle-Seats, of which the following is a specification.

My invention relates to improved means for the diffusion of vibrations caused by road travel, and otherwise, in motor driven vehicles.

The objects of my improvements are, first,—To provide means that will more completely and successfully absorb jars and diffuse vibrations than any means now in use for that purpose. Second:—To construct flexible, pneumatic bulbs, preferably of rubber and fabric in such a manner that they can be anchored securely between deforming means and also firmly connected to an air reservoir by means of conduits; said system having a check valve attached thereto, to which an air pump may be attached for inflating said air system to the desired pressure. Third:—To provide deforming means which will, owing to their form of construction, facilitate the deformation of said bulbs when placed between the aforesaid means and subject to action, without undue cramping or straining of the walls thereof, and also furnish reliable anchorage, *i. e.*, the sockets and apertures, for the aforesaid bulbs. Other substantial benefits are derived from the use of such means for deforming said bulb, such as prolonging the life of the pneumatic bulb, rendering more resilience and providing for the absorption of long and short vibrations. I attain these objects by the use of the mechanism illustrated in the accompanying drawings, in which, Figure 1 is a vehicle seat broken away in front in order to show the position of the pneumatic vibration diffuser. Fig. 2 is a sectional view of the pneumatic vibration diffuser and the deforming means attached to a bracket. Fig. 3 is a view of the inside of the top and bottom parts of a seat showing the position of the air reservoir relative to the position of the pneumatic vibration diffusers. On the inside of the top part of the seat may be seen the deforming means. Fig. 4 shows the pneumatic vibration diffuser positioned between the deforming means.

Similar figures refer to similar parts throughout the several views.

1 is a vehicle seat. 1' is the bottom part of said seat, 2 being the top part.

3 are the pneumatic vibration diffusers.

4 is an air reservoir. 4' is a means to connect said reservoir to the seat bottom.

5 are air conduits.

6 are deforming means with apertures therein.

6' are connecting plates and 7 are anchor bolts which are passed through an aperture in deforming means 6 and on through a hole in plate 6' sufficiently to screw a nut on, thereby securely fastening plate 6' and deforming means 6 together.

7' are screws which connect plates 6' to the underside of seat top 2.

8 are brackets with apertures therein.

8' are bolts which connect brackets 8 to the inside end of the vehicle seat. Screws 8'' securely hold deforming means 6 to bracket 8.

9 is a hollow shank and a part of the pneumatic vibration diffuser 3 constructed thus to afford an inlet for air by means of conduits 5 from air reservoir 4.

To position the pneumatic vibration diffuser 3: Pass the hollow shank 9 through the aperture in deforming means 6 and also through the aperture in bracket 8, insert nipple 10 into hollow shank 9; clamp 10' can now be adjusted to the outside of hollow shank 9, which, when screwed up tight, will not only form a fastening means to prevent air leakage, but, also holds the pneumatic vibration diffuser 3 in bracket 8.

11 are solid shanks and are a part of pneumatic vibration diffuser 3.

11' are sockets provided in deforming means 6 for shank 11 to fit in, thus forming a pivot which holds deforming means 6 and plate 6' onto the pneumatic vibration diffuser 3.

12 is a check valve on air reservoir 4 for the purpose of inflating the air system.

13 are dotted lines showing probable deformation when influenced by a jar.

It will be understood that the duty allotted to the pneumatic vibration diffusers is to diffuse such vibrations as might be transmitted to the seat part of the vehicle, thereby securing more comfort to the occupants of the vehicle.

The pneumatic bulbs are constructed with hollow and solid shanks, said shanks being a part thereof, not an adjunct thereto; the structural material used consists of alternate layers of rubber and rubber-coated fabric, so arranged as to produce the necessary strength and flexibility required by said structure.

Having thus described my invention what I claim and desire to secure by Letters Patent is:

I claim—

1. In pneumatic vibration diffusers, the combination of a plurality of pneumatic, flexible bulbs with solid and hollow shanks attached thereto, being a part thereof and projecting therefrom; an air reservoir with a check valve attached thereto; conduits affording communication between said bulbs and said air reservoir through said hollow shanks; pairs of convex deforming means, one member of said means having a socket and an aperture therein, the other member thereof having an aperture therein, between which the aforesaid bulbs may deform.

2. In pneumatic vibration diffusers, flexible bulbs with solid and hollow shanks attached thereto, being a part thereof and projecting therefrom; an air reservoir with a check valve attached thereto; conduits affording communication between said bulbs and said air reservoir through said hollow shanks; pairs of convex deforming means with apertures therein, one member of each pair of said deforming means having a socket therein, between which the aforesaid bulbs may deform, in combination with a vehicle seat.

3. In a pneumatic vibration diffuser a flexible bulb having flexible solid and tubular shanks, said shanks being a part thereof and projecting therefrom; a bracket attachment for the support of said bulb; an air reservoir with a check valve attached thereto; a conduit affording communication between said bulb and said air reservoir through said tubular shank; convex means in parts, one part having an aperture, the other part having an aperture and a socket therein to deform the aforesaid bulb when positioned for that purpose.

4. In a pneumatic vibration diffuser, the combination of a vehicle seat and a spherically formed bulb of flexible material, with projecting solid and hollow shanks, said shanks being a part thereof; an air reservoir with a check valve attached thereto; a conduit connecting said air reservoir and the aforesaid bulb by way of said hollow shank; convex deforming means in parts, with apertures therein, one of said parts also having a socket, between which a flexible bulb may deform.

5. In pneumatic vibration diffusers, the combination of spherically formed, flexible, pneumatic bulbs, with shanks projecting therefrom and being a part thereof, one of said shanks on each bulb having a passage therein through which a fluid may be admitted to the inside of said bulbs; an auxiliary fluid reservoir with a check valve attached thereto; conduits connecting said reservoir and the aforesaid bulbs; pairs of convex means with apertures therein to deform said bulbs, one member of each of said pairs having a socket.

6. In a pneumatic vibration diffuser, a flexible bulb having flexible shanks which are a part thereof and project therefrom, one of said shanks having a passage therein to receive a conduit through which a fluid may be admitted to the inside of sad bulb.

7. In a pneumatic vibration diffuser, a flexible, pneumatic bulb having flexible shanks which are a part thereof; one of said shanks having an unrestricted passage therein suitable to conduct a fluid to the interior of said bulb.

8. In a pneumatic vibration diffuser, a flexible, pneumatic bulb having flexible shanks which are a part thereof, one of said shanks having a passage therein suitable to receive a conduit through which a fluid can pass unrestrictedly between said bulb and a fluid reservoir; convex means, in parts, having receptacles suitable for the aforesaid flexible shanks to fit in.

9. In a pneumatic vibration diffuser, a flexible, pneumatic bulb having flexible shanks, one of said shanks having an unrestricted passage therein suitable for the passage of air to and from a reservoir of compressed air; convex means having receptacles for the aforesaid flexible shanks to fit in.

CHARLES H. COX.

Witnesses:
ALBERT E. SMITH,
MYRTLE C. EASON.